(12) United States Patent
Li

(10) Patent No.: US 7,398,553 B1
(45) Date of Patent: Jul. 8, 2008

(54) SCRIPTING VIRUS SCAN ENGINE

(75) Inventor: Jianghao Li, Jiangsu (CN)

(73) Assignee: Tread Micro, Inc. (JP)

( * ) Notice: Subject to any disclaimer, the term of this patent is extended or adjusted under 35 U.S.C. 154(b) by 998 days.

(21) Appl. No.: 10/042,804

(22) Filed: Oct. 29, 2001

Related U.S. Application Data

(60) Provisional application No. 60/244,618, filed on Oct. 30, 2000.

(51) Int. Cl.
*G06F 21/22* (2006.01)
*G06F 21/00* (2006.01)

(52) U.S. Cl. .............................. 726/22; 726/23; 726/24; 713/189; 713/190; 713/191; 713/192; 713/193; 713/194; 717/174; 717/168

(58) Field of Classification Search ................. 713/200, 713/188
See application file for complete search history.

(56) References Cited

U.S. PATENT DOCUMENTS

| | | | | |
|---|---|---|---|---|
| 5,452,442 A | * | 9/1995 | Kephart | 714/38 |
| 5,485,575 A | * | 1/1996 | Chess et al. | 714/38 |
| 5,696,822 A | * | 12/1997 | Nachenberg | 726/24 |
| 5,826,013 A | * | 10/1998 | Nachenberg | 726/22 |
| 5,951,698 A | * | 9/1999 | Chen et al. | 714/38 |
| 2002/0073330 A1 | * | 6/2002 | Chandnani et al. | 713/200 |
| 2005/0102601 A1 | * | 5/2005 | Wells | 714/758 |

* cited by examiner

*Primary Examiner*—Syed A. Zia
(74) *Attorney, Agent, or Firm*—Beyer Law Group LLP

(57) ABSTRACT

Detecting and identifying an interpreted language virus, such as a scripting virus, and reasonably identifiable polymorphs of the virus source code. Scripting virus source is extracted and represented in a language independent form. This form includes a linearized set of key actions, termed an executing thread, rather than the scripting source code. The executing thread can be utilized to generate a virus signature and virus pattern file for use in identifying the virus in later extracted scripting virus source code. Further the executing thread may be compared to existing virus signatures to determine the identity of the virus, if a match is made. The scripting virus scan engine detects reasonably identifiable polymorphs of a scripting virus source code that involve lexical and grammatical transformations, such as manipulation of white space, renaming of identifiers, and change of program layout.

28 Claims, 12 Drawing Sheets

EVOLUTION OF COMPUTER VIRUSES

|  | First Generation | Second Generation |
|---|---|---|
| Language | Assembly language | Scripting language |
| Distribution Form | Binary | Source |
| Host Platform | CPU and OS | Source |
| Host Object | Executable codes | Documents |
| Propagation Media | Physical media | Network |

FIG. 1
(PRIOR ART)

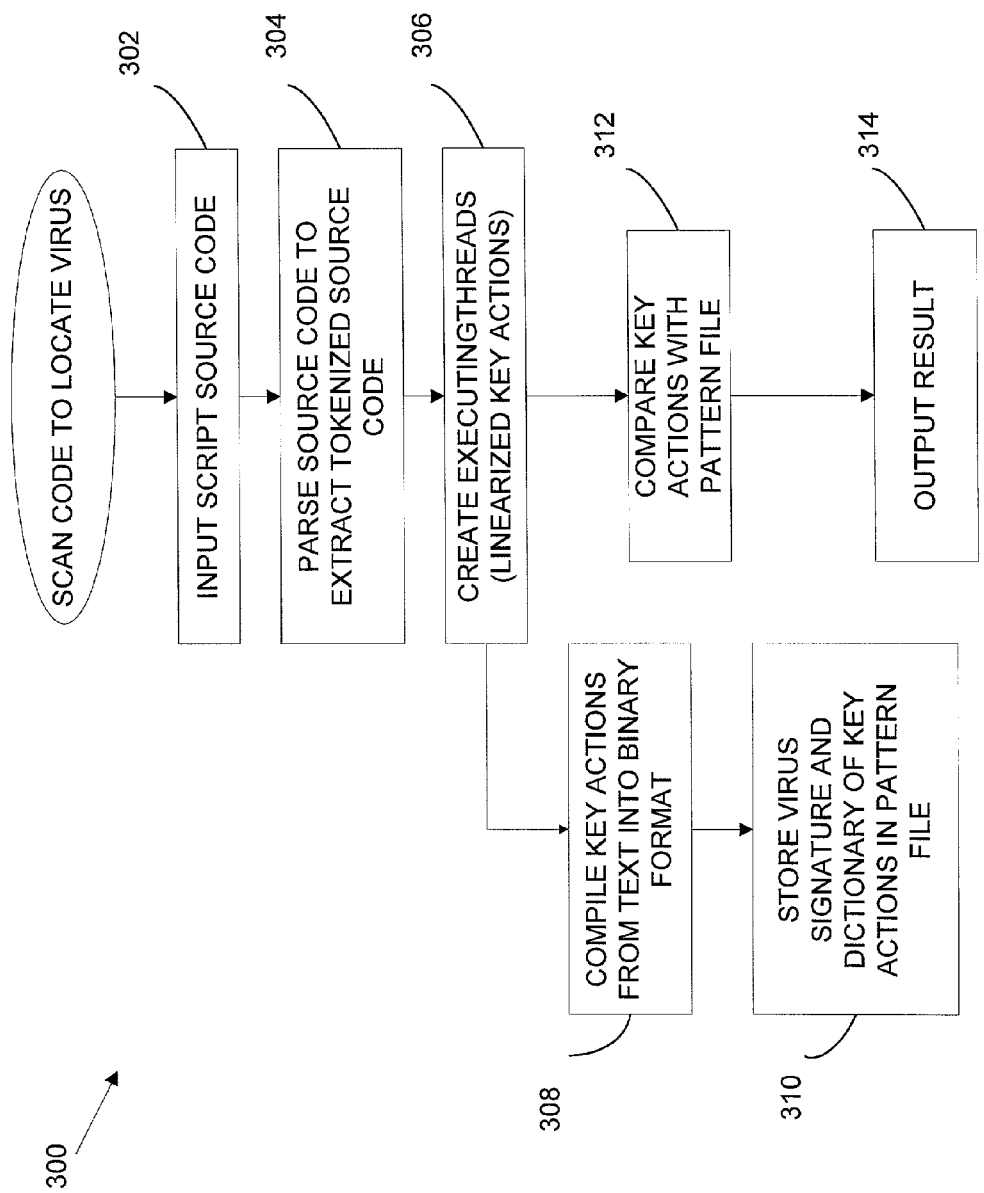

SCRIPT SOURCE CODE

```
Private fso
Sub   F1
Set file =fso . OpenTextFile ("your bank account", ForReading, True)
str = file . ReadLine
file . Close ( )
End   Sub Sub   F2
Set file =fso . CreateTextFile ("c:\autoexec.bat", True )
file . WriteLine ("format c:" )
file  .  Close   ( )
End   Sub On Error   Resume   Next
Set fso=CreateObject  ("Scripting.FileSystemObject" )
Call   F1
Call   F2
```

FIG. 5A

TOKENIZED SOURCE CODE

```
Private fso
Sub   F1
Set file = fso . OpenTextFile ( "your bank account" , ForReading , True )
str = file . ReadLine
file . Close ( )
End   Sub Sub   F2
Set file = fso . CreateTextFile ( "c:\autoexec.bat" , True )
file . WriteLine ( "format c:" )
file  .  Close   ( )
End   Sub On Error   Resume   Next
Set fso = CreateObject ( "Scripting.FileSystemObject" )
Call   F1
Call   F2
```

FIG. 5B

LINEARIZED KEY ACTIONS

Sub  Main

CreateObject
OpenTextFile
ReadLine
Close
CreateTextFile
WriteLine
Close

FIG. 7

POLYMORPH SCRIPT SOURCE CODE

```
Private obj
Sub   Func2
Set file = obj. CreateTextFile ("c:\autoexec.bat", True )
file . WriteLine ("format c:" )
file . Close   (   )
End   Sub Sub   F1
Set file = obj . OpenTextFile ("your bank account", ForReading, True)
str = file . ReadLine
file   .   Close   (   )
End   Sub On Error   Resume   Next
Set obj = CreateObject  ("Scripting.FileSystemObject" )
Call   F1
Call   Func2
```

FIG. 9A

TOKENIZED POLYMORPH SOURCE CODE

```
Private obj
Sub   Func2
Set file = obj . CreateTextFile ( "c:\autoexec.bat" , True )
file . WriteLine ( "format c:" )
file . Close ( )
End   Sub Sub   F1
Set file = obj . OpenTextFile ( "your bank account" , ForReading , True )
str = file . ReadLine
file   .   Close   (   )
End   Sub On Error   Resume   Next
Set obj = CreateObject ( "Scripting.FileSystemObject" )
Call   F1
Call   Func2
```

FIG. 9B

LINEARIZED KEY ACTIONS OF POLYMORPH

Sub   Main

CreateObject
    OpenTextFile
    ReadLine
    Close
    CreateTextFile
    WriteLine
    Close

FIG. 11

SCRIPTING VIRUS SCAN ENGINE

CROSS REFERENCE TO RELATED APPLICATIONS

This application claims the benefit of U.S. Provisional Application No. 60/244,618 filed Oct. 30, 2000 and which is hereby incorporated by reference.

FIELD OF THE INVENTION

The present invention relates generally to scanning computer code for viruses and for providing results pertaining to the viruses found. In particular, the present invention relates to the scanning of interpreted language viruses, such as scripting viruses.

BACKGROUND OF THE INVENTION

Widespread usage of the Internet has led to more widespread occurrences of destructive computer "viruses" that often cause extensive computer network damage or downtime. A "virus" is a piece of programming code usually disguised as something else that causes some unexpected and usually undesirable event (for the victim). Viruses are often designed so that they automatically spread to other computer users across network connections. For instance, viruses can be transmitted by sending them as attachments to an e-mail note, by downloading infected programming from other sites, and by inserting into a computer a diskette or CD-ROM containing a virus. The source application that deals with the e-mail note, downloaded file, or diskette is often unaware of the virus. Some viruses wreak their effect as soon as their code is executed; other viruses lie dormant until circumstances cause their code to be executed by the computer. Some viruses can be quite harmful, causing a hard disk to require reformatting or clogging networks with unnecessary traffic.

With the rapid development of distributed computing technology, more and more interpreted programming languages, such as scripting languages, are designed to satisfy the requirement of heterogeneous computing and development environments. Some examples of scripting languages are JavaScript, VBScript, Perl and the UNIX shell. Although run-time performance of scripting languages is typically poor, these languages offer good cross-platform support and are widely used in applications. Some scripting languages are specially designed for Internet applications and are used in web publishing and are supported by most web browsers. Some examples of these scripting languages are JavaScript and VBScript. Some web browsers not only support the scripting languages in the web browser, but also enhance the functions to include additional features. A significant enhancement, or feature, is the ability to access local resources, including local applications and local files. These new enhancements also introduce the potential for security breaches in which malicious codes could obtain unauthorized access to local resources. Currently more than one hundred viruses utilize this feature to propagate and damage or destroy the host system or related resources. Often it only takes a matter of days or even hours for a virus to spread worldwide. Thus, efficient virus detection and identification stems the spread of the virus by enabling the viral pattern to be identified and communicated to others to aid its detection and removal prior to infection of further computer systems.

Anti-virus (or "anti-viral") software is a class of program that searches computer code, such as that found on a computer's hard drive and floppy disks, for any known or potential viruses. The market for this kind of program has expanded because of Internet growth and the increasing use of the Internet by businesses concerned about protecting their computer assets. However, with the improvement of anti-virus technology, virus technology has improved too.

FIG. 1 is a table illustrating a general overview of the evolution of virus forms. Earlier viral forms, first generation, were generally written in assembly language and distributed in binary code form. The host platform on which the virus was run was usually a certain central processing unit (CPU) or certain operating system (OS). Typically, the host object in which the virus resided was executable code and the propagation of the virus was through physical media, for example, floppy disks.

More recent viral forms, second generation, are being written in an interpreted language, such as a scripting language, and are distributed in source code. The host platform is usually a certain computer application that could run on many CPUs or operating systems. The host object is typically a document, such as application documents or e-mail, and the virus is propagated through networks, such as the Internet or intranets.

FIG. 2 is a representative block diagram in the prior art showing an overview of a conventional system 100 for virus detection and identification. Typically, scripting source code 104 is extracted from a text file 102 as input to a virus scan engine 106. There, the code 104 is compared against identified virus patterns in a pattern file 108, often from a pattern file database, until a matching virus pattern is found. An output message 110 then results that presents the results of the virus scan, such as the identity of any virus found. In cases where it is known that the source code 104 contains a virus, and a virus pattern cannot be matched, typically, the source code 104 is then utilized in forming a new virus pattern for input to the pattern file 108.

Current virus scanning technology in the scan engine 106 is based on byte code matching algorithms where exact matches of code pattern strings in code 104 are made with an identified virus pattern file. The pattern file typically contains the most important code pattern strings of a virus code pattern. This pattern matching process enables the detection of exact matches of the virus code, e.g., unmodified scripting virus code, but is ineffective with polymorphous scripting viruses.

Polymorphs of scripting viruses are versions of an original scripting virus made by what are often small changes to the original virus form, i.e., the code is not exactly the same as the original virus but still has the same effects. Polymorphs are easy to create and can be developed by individuals and/or by using polymorph engines.

Polymorph engines are generally computer programs that are capable of making lexical and grammatical transformations of the code, for example, manipulation of white space, renaming of identifiers, and/or changing the program layout. Typically, polymorph engines, although prolific, cannot reliably change the execution order of statements.

A polymorph of a virus that involves rearrangement of the execution order is more typically created by an individual. Currently, lexical transformations are the more typical polymorph form. Unfortunately, proliferation of polymorphs can quickly outpace the detection and identification efforts of current virus scanning methods that utilize exact pattern matching. Polymorphs can do this by continually including small modifications to the known viral code.

Accordingly, what is needed in the field is a method and/or apparatus for detecting and identifying a scripting virus pattern so that the virus and its polymorphs may also be detected and identified.

SUMMARY OF THE INVENTION

To achieve the foregoing, and in accordance with the purpose of the present invention, an apparatus and method are disclosed that provide for detection and identification of an interpreted language source code virus and reasonably identifiable polymorphs of the virus. The present invention is directed to polymorphs involving lexical and grammatical transformations of a scripting virus, such as manipulation of white space, renaming of identifiers, change of program layout, and other similar transformations.

According to one aspect of the present invention, a method for identifying a virus in interpreted language source code is described, the method including: receiving a portion of interpreted language source code; generating a language-independent representation of the portion of the interpreted language source code; comparing the language-independent representation with a virus signature; and determining if the language-independent representation matches the virus signature, whereby a match indicates a computer virus has been identified.

According to another aspect of the present invention, a method for generating a virus signature is described, the method including: receiving a portion of interpreted language source code containing a virus; generating a language-independent representation of the virus; and storing the language-independent representation of the virus as a virus signature.

According to another aspect of the present invention, a method for identifying a virus in interpreted language source code is described, the method including: receiving a portion of interpreted language source code; parsing the portion of the interpreted language source code into tokens to generate a tokenized source code, wherein at least some of the tokens represent key actions; extracting selected key actions from the tokenized source code; linearizing the key actions to generate an executing thread; comparing the executing thread with a virus signature of a known virus; and determining whether the executing thread matches the virus signature.

According to another aspect of the present invention, a method for generating a virus signature from a portion of interpreted language source code including a computer virus is described, the method including: receiving a portion of interpreted language source code containing a computer virus; parsing the portion of the interpreted language source code containing the computer virus into tokens to generate tokenized source code, wherein at least some of the tokens represent key actions; extracting key actions from the tokenized source code, linearizing the key actions to generate an executing thread; determining the set of minimum key actions in the executing thread required to effect the computer virus; and, storing the set of minimum key actions as a virus signature.

According to another aspect of the present invention, a computer readable medium containing program code for identifying a computer virus in a portion of interpreted language source code is described, the computer readable medium including instructions for: receiving a portion of interpreted language source code; parsing the portion of the interpreted language source code into tokens to generate a tokenized source code, wherein at least some of the tokens represent key actions; linearizing at least a portion of the key actions to generate an executing thread; comparing the executing thread with a virus signature of a known computer virus; and determining whether the executing thread matches the virus signature.

According to another aspect of the present invention, a computer readable medium containing program code for generating a virus signature from a portion of interpreted language source code containing a computer virus is described, the computer readable medium including instructions for: receiving a portion of interpreted language source code containing a computer virus; parsing the portion of the interpreted language source code containing the computer virus into tokens to generate tokenized source code, wherein at least some of the tokens represent key actions; linearizing at least a portion of the key actions to generate an executing thread; determining the set of minimum key actions in the executing thread required to effect the computer virus; and storing the set of minimum key actions as a virus signature.

These and other aspects and advantages of the present invention will become apparent upon analysis of the following detailed descriptions and study of the various figures and drawings.

BRIEF DESCRIPTION OF THE DRAWINGS

The invention, together with further advantages thereof, may best be understood by reference to the following description taken in conjunction with the accompanying drawings in which:

FIG. 1 is a table illustrating a general overview of the evolution of virus forms;

FIG. 4 is a flow diagram illustrating one example of method 300 for identifying a scripting virus according to one embodiment of the present invention;

FIG. 5A illustrates a portion of scripting source code that is extracted from a document to be scanned for viruses;

FIG. 5B illustrates the tokenization of the original source code by the parser according to one embodiment of the present invention;

FIG. 7 illustrates one example of the linearization of the key actions by the threadizor according to one embodiment of the present invention;

FIG. 9A illustrates a polymorph of a portion of the scripting source code shown in FIG. 5A;

FIG. 9B illustrates the tokenization of the polymorph original source code of FIG. 9A by the parser according to one embodiment of the present invention;

FIG. 11 illustrates one example of the linearization of the polymorph key actions by the threadizor according to one embodiment of the present invention; and, FIGS. 12A and 12B illustrate an example of a computer system suitable for use in implementing the present invention.

DETAILED DESCRIPTION OF THE INVENTION

Figure 2:
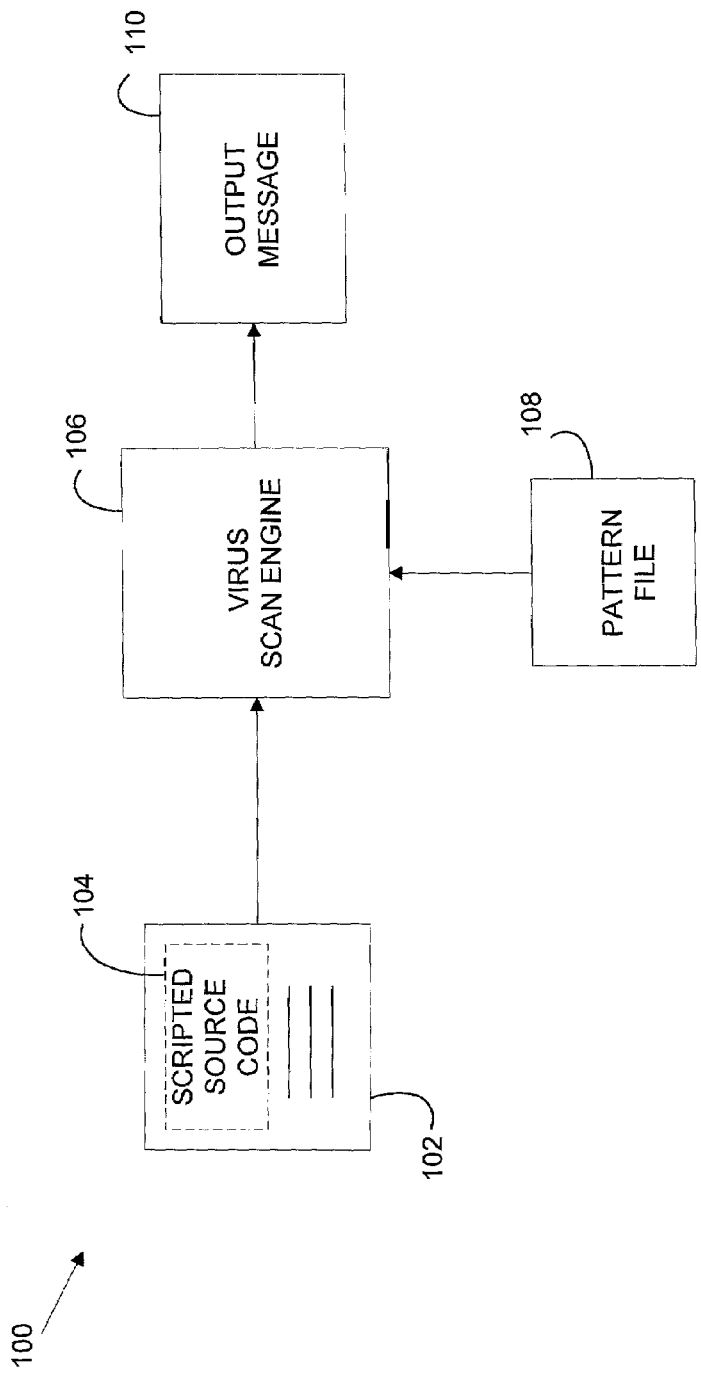
FIG. 2 is a representative block diagram in the prior art showing an overview of a conventional system for virus detection and identification.

The present invention will now be described in detail with reference to a few preferred embodiments thereof as illustrated in the accompanying drawings. In the following description, numerous specific details are set forth in order to provide a thorough understanding of the present invention. It will be apparent, however, to one skilled in the art, that the present invention may be practiced without some or all of these specific details. In other instances, well known process steps and/or structures have not been described in detail so that the present invention will not be unnecessarily obscured in any way.

In order for a virus to act on a system, it typically calls some native methods and functions that are provided by the scripting interpreter, in some particular sequence. For example, to infect a HTML document, a virus performs the following actions, listed in VBScript, first, and in JavaScript, second:

Set fso=CreateObject(Scripting.FileSystemObject)

Set f=fso.OpenTextFile(FileName)

f.WriteLine "SomeThing"

f.Close

Var fso=new ActiveXObject(Scripting.FileSystemObject);

Var f=fso.OpenTextFile(FileName);

f.WriteLine "SomeThing";

f.Close;

Although the two code pieces are written in different languages, they are very similar in that they create the same object and invoke the same methods. The differences are in the variable names and declarations. As scripting viruses are propagated via source code, the same virus could be represented in different forms, using different variables, control flows, and functions, or by adding/removing space characters. Thus, the present invention, differently from the prior art, identifies a virus by key actions that are scattered in the source code, rather than the source code itself, and thus, provides an important advantage.

In general, key actions may be considered to be inherent features, structure, and/or properties of a scripting language that a programmer or a polymorph engine may not readily change. The present invention provides a scripting virus scan engine for detecting and identifying a scripting virus and reasonably identifiable polymorphs of the scripting virus by representing the scripting virus in a language independent form. Preferably, the language independent form includes a linearized executing thread of key actions, rather than scripting source code. The key actions may include reserved words in programming languages, system methods, system properties, and others, such as methods and properties of system objects predefined in object-oriented programming languages. Preferably, variables and functions that are defined by the programmer are not considered key actions as they can be easily changed. The present invention may be implemented for use in detecting reasonably identifiable polymorphs that involve lexical and grammatical transformations, such as manipulation of white spaces, renaming of identifiers, and change of program layout.

Basically two approaches can be used for detecting a scripting virus: dynamic monitoring and static analysis. In dynamic monitoring, the scripting source code can be run and stopped in action. This enables detection of polymorphs of known viruses and detection of unknown viruses. However, it is difficult to find opportunities to run scripting source code while in transit before it infects the target and requires a lot of computing resources. Thus, the present invention is discussed herein in terms of static analysis of scripting source code.

Figure 3:
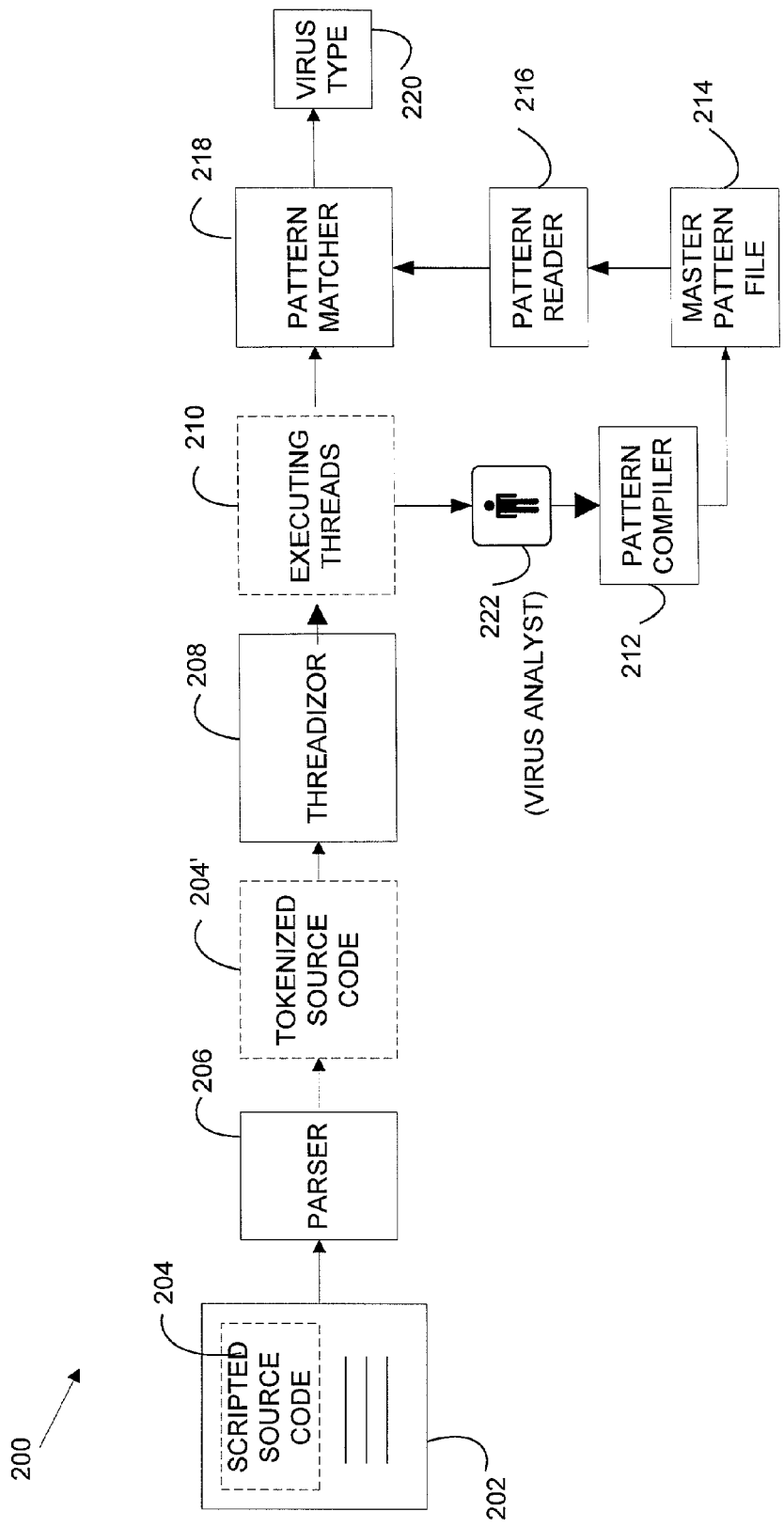
FIG. 3 is a representative block diagram illustrating one example of a scripting virus scan engine 200 for detecting and identifying a scripting virus according to one embodiment of the present invention.

FIG. 3 is a representative block diagram illustrating one example of a scripting virus scan engine 200 for detecting and identifying a scripting virus according to one embodiment of the present invention. Scripting source code 204, suspected of containing a virus, is extracted or screened from a document 202 and is input to parser 206. It will be appreciated that the scripting source code may be in any interpreted language, such as JavaScript, VBScript, or Perl, and may also be embedded in HTML files.

Document 202 is any suitable electronic medium in which the scripting source code is found, including: an electronic mail message (e-mail), an Internet or intranet web page, a file on a disk or CD-ROM, or memory of a computer. Parser 206 is a lexical and/or grammatical parser that can parse different scripting languages into tokenized source code 204' made up lexical and/or grammatical tokens. The parser 206 extracts all lexical tokens, including identifiers, operators, literal constants, and separators from the source code. The parser 206 may also extract grammatical tokens, such as user-defined functions and function caller/callee relations. The lexical and/or grammatical token is defined in the compiler theory of computer science. The tokenized source code 204' is then input to a threadizor 208.

Key actions are defined in terms of a set of lexical and grammatical tokens, which have non-trivial meaning in scripting languages. They are defined in a master dictionary of tokens that may be located in the parser 206 or located elsewhere in the scripting virus scan engine 200 but accessible by the parser 206. In one embodiment, the key actions include reserved keywords in scripting language and extended system objects, methods, and properties that can be interpreted by a scripting host, such as Microsoft Internet Explorer, Microsoft Internet Information Server or Microsoft Windows Scripting Host. Besides the master dictionary, there is a token lookup table to convert the language-dependent tokens to language-independent tokens. The tokenized source code 204' is then input to a threadizor 208.

The threadizor 208 eliminates "noise" from the tokenized source code 204' based on dictionary of key actions, converts the tokens to language-independent representation and "flattens" the function-calling representation of key actions into a linearized form, or executing thread. The threadizor 208 extracts key actions from the tokenized source code 204' and may also extract some tokens necessary to execution. The tokens that are not in the dictionary are termed "noise" and are discarded by the threadizor 208.

The threadizor 208 simulates execution of the extracted key actions to generate linearized key action sequences termed executing threads 210 for each entry point into the code. Scripting programs have at least one main entry point. Some scripting programs may have more than one entry point. For example, JavaScript and VBScript programs are typically embedded in HTML, and, thus, some HTML-related event handlers are written in the script and may be considered entry points as well. Starting from each entry point, the threadizor 208 simulates the execution of the program and records all key actions into an execution line, or executing thread.

The executing threads 210 may then be communicated along two paths. One path is to a pattern compiler 212 for generation of a virus signature to be input to a master pattern file 214. Generation of a virus signature is also termed virus pattern extraction or virus signature extraction. This path provides for the generation of a virus signature for new viruses. When new viruses are found and analyzed by the virus analyst 222, the new virus code is used as scripting source code 204 and input to parser 206. This path helps the virus analyst 222 and reduces the analyzing workload since it generates a rough signature of the virus. The other path is to a pattern matcher 218 for use in virus pattern or virus signature identification. This second path is used by the virus scan engine 200 for matching known virus signatures and detecting the possible virus.

When we know that the scripting source code 204 is a scripting virus, the executing threads 210 are sent to the virus analyst 222. Virus analyst 222 evaluates and revises the executing threads 210 to determine the minimum key actions required for a virus to properly infect a system, e.g., the minimum key action set. This minimum key action set is termed the virus signature. The virus analyst 222 may augment the virus signature to include more or fewer key actions. Too many key actions will result in some viruses circumventing a pattern match due to lack of an identified a key action, while too few key actions will result in too many input codes being identified as viruses, e.g., false alarms.

The virus analyst 222 may also add logical nodes and/or pointers to the virus signature. These nodes may assist in later pattern matching processes to indicate matching orders of key actions in the virus signature, such as serial or parallel matching orders. Additionally, the virus analyst 222 can expand the dictionary of key actions and put the dictionary of key actions into the virus pattern file to aid in the interpretation of the virus signature. By placing the dictionary of key actions in the virus pattern file, rather than predefining in the parser 206, the virus analyst 222 has greater flexibility in designing the virus pattern since he/she can expand the dictionary to cover new key actions which are not defined in original design.

The revised executing threads, e.g., the virus signature is then input to the pattern compiler 212. The pattern compiler 212 then compiles the virus signature as an output virus pattern file. The pattern compiler 212 may generate the virus pattern file in a variety of formats, such as, for example, text or binary formats. The pattern compiler 212 will also create the dictionary of key actions that define the virus signature as part of the virus pattern file. The virus pattern file is then input to the master pattern file 214.

With the second path, the executing threads 210 are input to a pattern matcher 218 which compares the current program's executing thread 210 against a virus signature. A pattern reader 216 reads the virus signature from a virus pattern file in the master pattern file 214 and inputs the virus signature to the pattern matcher 218. The pattern matcher 218 compares the current program's executing thread 210 with the virus signature and outputs the result 220 of the pattern matching process.

The pattern matching process is implemented in a variety of ways. The basic pattern matching process is serial chain matching. A serial chain is an ordered sequence of key action nodes. In serial chain matching, all the key actions in the virus signature must be matched in the exact order to the key actions of the executing thread 210. There may be some extra key actions in the executing thread 210, which are termed "noise", that are discarded.

A more complex pattern matching process is parallel chain pattern matching. A parallel chain is composed of two or more serial chains, and includes "AND" and "OR" type logic nodes. In an "AND" type chain, all of the serial chains must be matched using a serial chain matching algorithm, but the matching order of every serial chain, even every key action in every serial chain, is not mandatory. However, the matching order of all key actions in a certain serial chain is mandatory.

In an "OR" type chain, either of the serial chains must be matched using a serial chain matching algorithm with the mandatory matching order. Furthermore, a parallel chain could substitute in to one or more key action nodes of a serial chain, so that serial chain and parallel chains could be iterated in the virus signature design, resulting in a very flexible virus signature.

FIG. 4 is a flow diagram illustrating one example of method 300 for identifying a scripting virus according to one embodiment of the present invention. Essentially the present invention may be viewed as two parts: virus signature extraction and virus signature matching. In virus signature extraction, the scripting source code is reduced to one or more executing threads from which a virus signature may be developed by a virus analyst. The virus analyst then compiles the virus signature together with any additional information selected by the virus analyst and a virus pattern file is generated and saved in a master pattern file. In virus signature matching, an executing thread is compared to existing virus signatures in order to identify the virus, if known.

For purposes of illustration, suppose a scripting virus is spreading. A virus analyst invokes the virus signature extraction process of the present invention to generate a virus signature and create a virus pattern file. The new virus pattern file may then be distributed to a master pattern file and/or to other users. When a user wants to check whether his/her documents are infected by the virus, he/she invokes the virus signature matching process of the present invention. Thus, while the virus extraction process may be more typically invoked by a virus analyst, the virus signature matching process may be invoked many times by different users.

Virus Signature Extraction

Turning first to virus signature extraction, scripting source code, which may be pre-screened or extracted from a source document 202, is input to the lexical and/or grammatical parser 206 at step 302.

At step 304, the parser tokenizes the scripting source code into tokenized source code. The tokenization process is the same as lexical parsing in modern compiler theory in computer science—all identifiers, operators, and punctuations are separated and white spaces are discarded.

At step 308, the tokenized source code is communicated to the threadizor that eliminates noise from the tokenized source code by retaining only selected key actions, and converts those into language-independent representations. The threadizor then simulates execution of the extracted token stream at each entry point to the program and generates a linearized string of key actions, termed executing threads, for each entry point. FIGS. 5A-7 illustrate one example of the transformation of scripting source code to an executing thread (steps 302-306) according to one embodiment of the present invention.

FIG. 5A illustrates a portion of scripting source code that is extracted from a document to be scanned for viruses. In the present illustration, the original source code is shown in VBScript. It will, however, be appreciated by those of skill in the art that the scripting source code may be another interpreted language such as JavaScript, VBScript, Perl, etc.

FIG. 5B illustrates the tokenization of the original source code by the lexical/grammatical parser according to one embodiment of the present invention. The parser parses, or tokenizes, the source code into tokenized source code, as earlier described with reference to step 304. In the present illustration, each token is delineated by underlining. The tokenized source code is then communicated to the threadizor.

Figure 6:
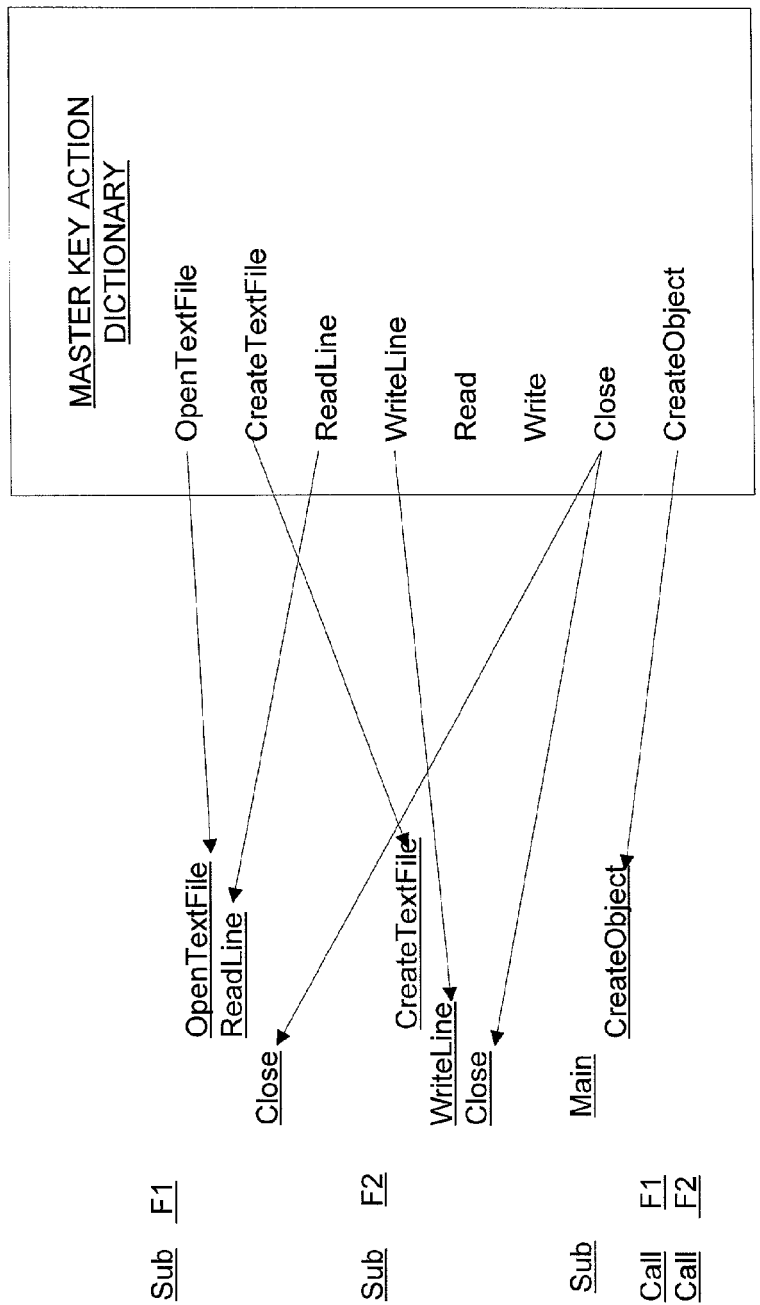
FIG. 6 illustrates the elimination of noise from the tokenized code by the threadizor according to one embodiment of the present invention.

FIG. 6 illustrates the elimination of noise from the tokenized code by the threadizor according to one embodiment of the present invention. In this example, the threadizor retains key action tokens and some execution-related tokens from the tokenized source code defined in the master key action dictionary, discards an remaining tokens, e.g., "noise", leaving only a tokenized skeleton of the original scripting source code.

The threadizor then simulates execution of the key action token stream at entry points in the key action token stream and records the key actions as they would be executed in a procedural programming language. The resulting linearized key actions are termed executing threads. An executing thread is obtained for each entry point in the key action token stream and may be communicated to both the pattern matcher for identification against existing virus signatures and to the pattern compiler for generation of a virus signature and virus pattern file.

FIG. 7 illustrates one example of the linearization of the key actions by the threadizor according to one embodiment of the present invention. As shown in the present illustration, the key actions are linearized in execution order resulting in an executing thread for each entry point in the key action token stream.

Returning to the flow diagram of FIG. 4, at step 308, the executing threads are received by a virus analyst who evaluates and revises the executing threads, as needed, to produce a virus signature. The virus signature, and any additional information, is then input for compilation to the pattern compiler. As earlier described, the virus analyst determines the virus signature and may also add serial chain, parallel chain, and/or their iterations to the virus signature. For example, the analyst may include an "AND" chain which is composed of three serial chains in a virus signature. The virus signature plus any information added by the virus analyst, such as a dictionary of key actions, is then compacted by the pattern compiler into a virus pattern file. At step 310, the virus pattern file is stored in the master pattern file for later use in identification of the virus in other scripting source code.

Figure 8:
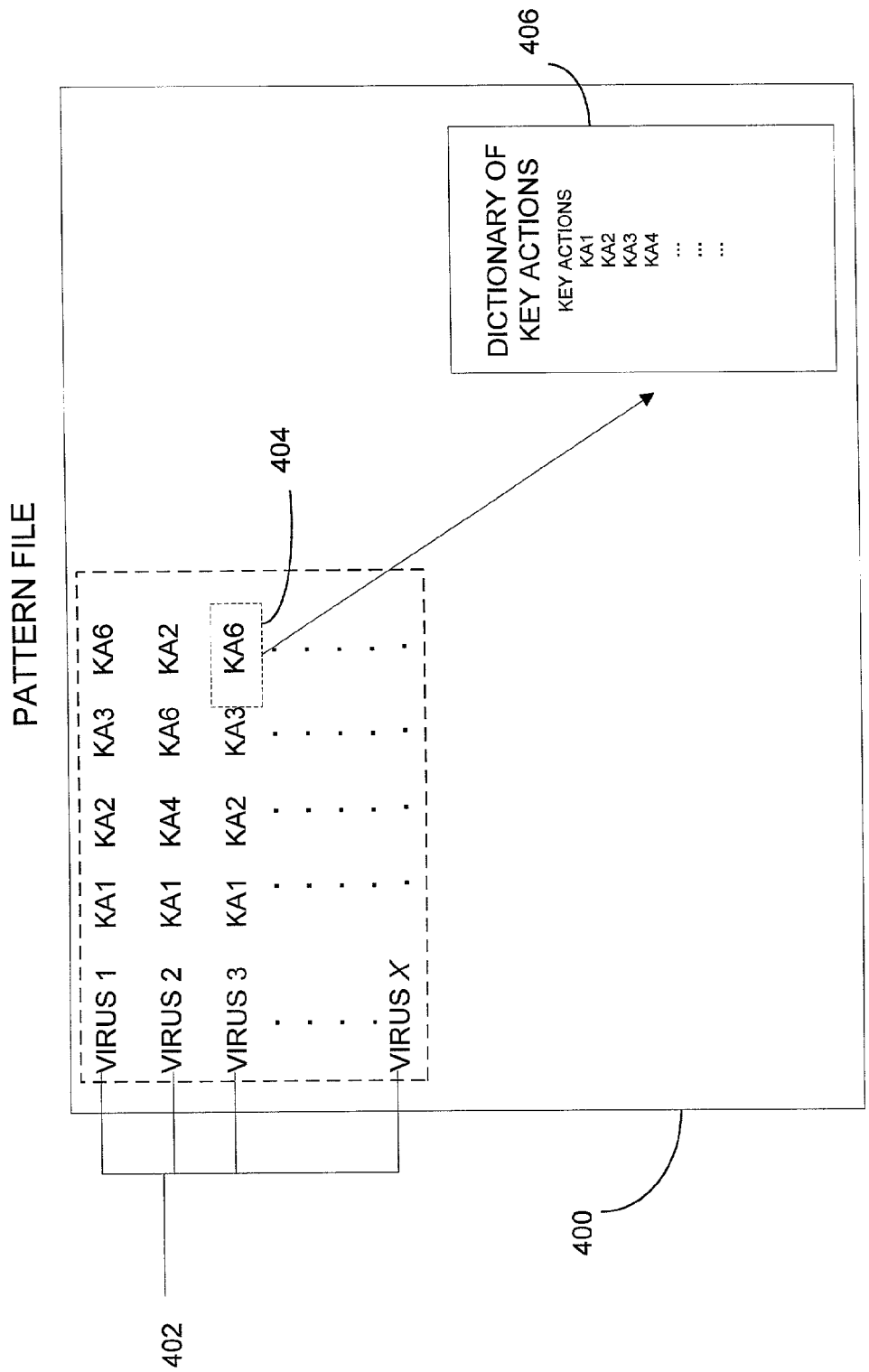
FIG. 8 is a block diagram illustrating one example of a pattern file according to one embodiment of the present invention.

FIG. 8 is a block diagram illustrating one example of a virus pattern file according to one embodiment of the present invention. There are a wide variety of ways in which the virus pattern file may be structured. In one embodiment, the virus pattern file 400 may include one or several virus signatures 402 in which the key actions (KA) 404 representing the virus are indexed with the virus name, i.e., VIRUS 3. In one embodiment, the key actions may be represented in binary format. As earlier described with reference to FIG. 4, the virus pattern file 400 may further include a dictionary of key actions 406. In some embodiments, the dictionary of key actions may be segmented such that different segments store key actions related to a particular scripting language, for example, sub-dictionaries of key actions related to JavaScript, VBScript, and Perl. In other embodiments, the dictionary or dictionaries of key actions (including any segments) may be stored independent of the virus pattern file, such as for example, in the master pattern file 214, or in any component of the scripting virus scan engine 200, or within a system accessible by the scripting virus scan engine 200.

Virus Signature Matching

As earlier discussed, the scripting virus scan engine 200 also provides for the scanning of documents and identification of a known virus. In this process, an executing thread is compared with an existing virus signature which is generated in the previous virus signature extraction process invoked by the virus analyst in order to identify a virus, if known.

Again returning to FIG. 4, with virus signature matching, at step 312, the executing threads are input to the pattern matcher for comparison with virus signatures stored in the master pattern file. The master pattern file may be a file, group of files, a database, or databases, that contains a virus signature(s) or an equivalent of the virus signature(s) used for identification of a virus as earlier described herein.

In one embodiment, a pattern reader is used to read a virus signature from a virus pattern file stored in the master pattern file. The pattern reader converts the binary code format of key actions in the virus signature to text format utilizing the dictionary of key actions. The resulting virus signature is then compared with the input executing thread by the pattern matcher, as earlier described with reference to the serial and parallel chain, to determine if there is a match, and outputs the result 314, such as the identification of a virus if a match is made, or a notification that no match was found.

Earlier, FIGS. 5A-7 illustrated the use of the present invention to reduce original scripting source code containing a virus to one or more executing threads that could be used in generating a virus signature and for identification of a known virus through a pattern matching process. FIGS. 9A-11 illustrate one example of how the use of the present invention permits the detection of a virus in polymorphs of the original scripting virus source code.

FIG. 9A illustrates a polymorph of a portion of the scripting source code shown in FIG. 5A. Note that "fso" in the original virus scripting source code of FIG. 5A is now "obj" in the polymorph in FIG. 9A. Further, "F2" in FIG. 5A, is now "Func2" in the polymorph in FIG. 9A. Additionally, the program layout of the polymorph in FIG. 9A lists the "F1" subroutine after the "Func2" subroutine, rather than before it, as in FIG. 5A.

FIG. 9B illustrates the tokenization of the polymorph original source code of FIG. 9A by the parser as earlier described with reference to FIG. 5B.

Figure 10:
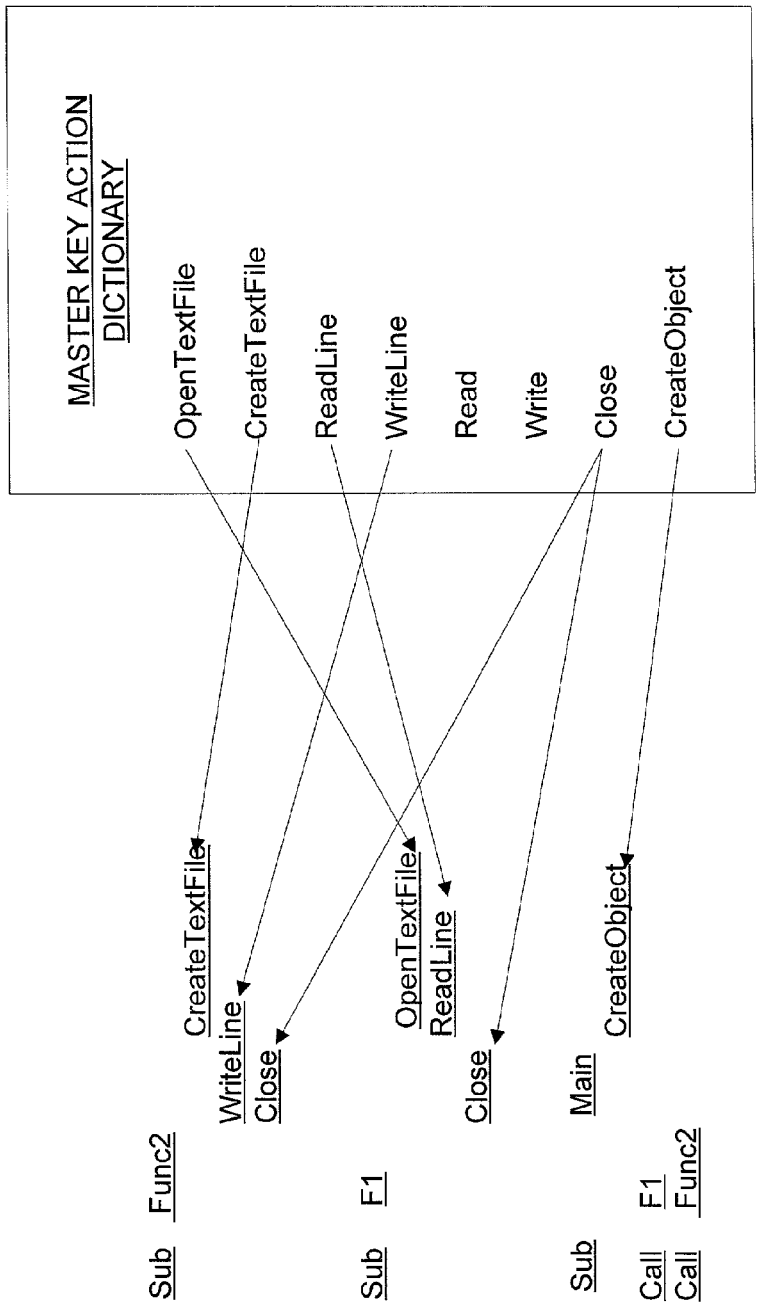
FIG. 10 illustrates the elimination of noise from tokenized polymorph code by the threadizor according to one embodiment of the present invention.

FIG. 10 illustrates the elimination of noise from tokenized polymorph code by the threadizor as earlier described with reference to FIG. 6. In the present example, note how the polymorph is beginning to appear more similar to FIG. 6, but the key action sequence has not yet been linearized.

FIG. 11 illustrates one example of the linearization of the polymorph key actions by the threadizor. As shown in the present illustration, the executing thread of the polymorph now presents the executing thread of the original source code shown in FIG. 7. Although the polymorph changed some of the identifiers, and the program layout, use of the present invention reduced the polymorph scripting source code into an executing thread that could be matched with the known original virus signature. In this way, use of the present invention enables detection of lexical and/or grammatical polymorphs of a scripting virus.

Figure 12A:
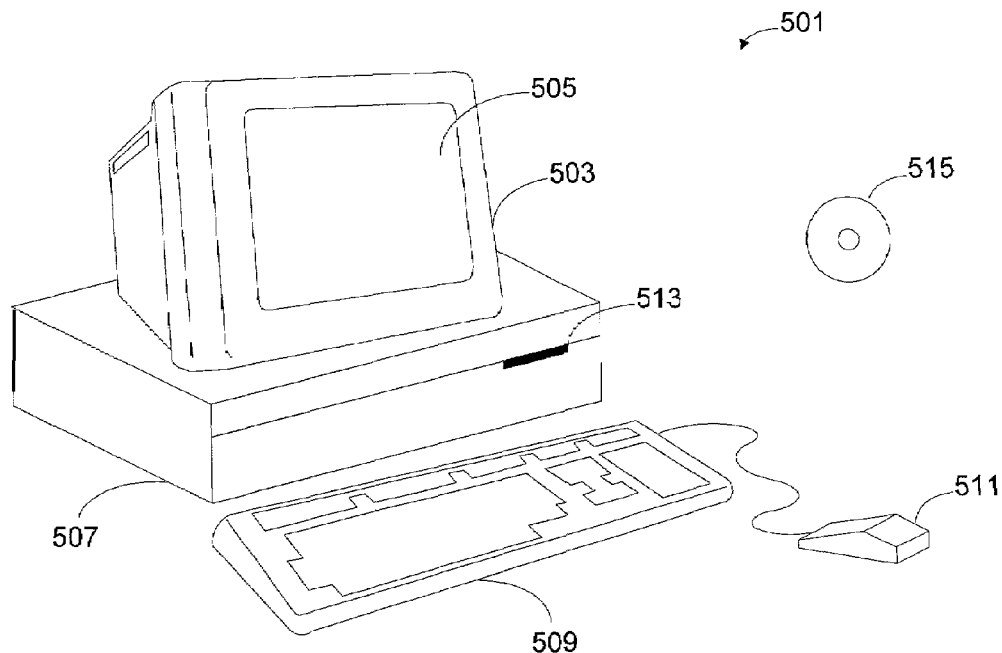
Figure 12B:
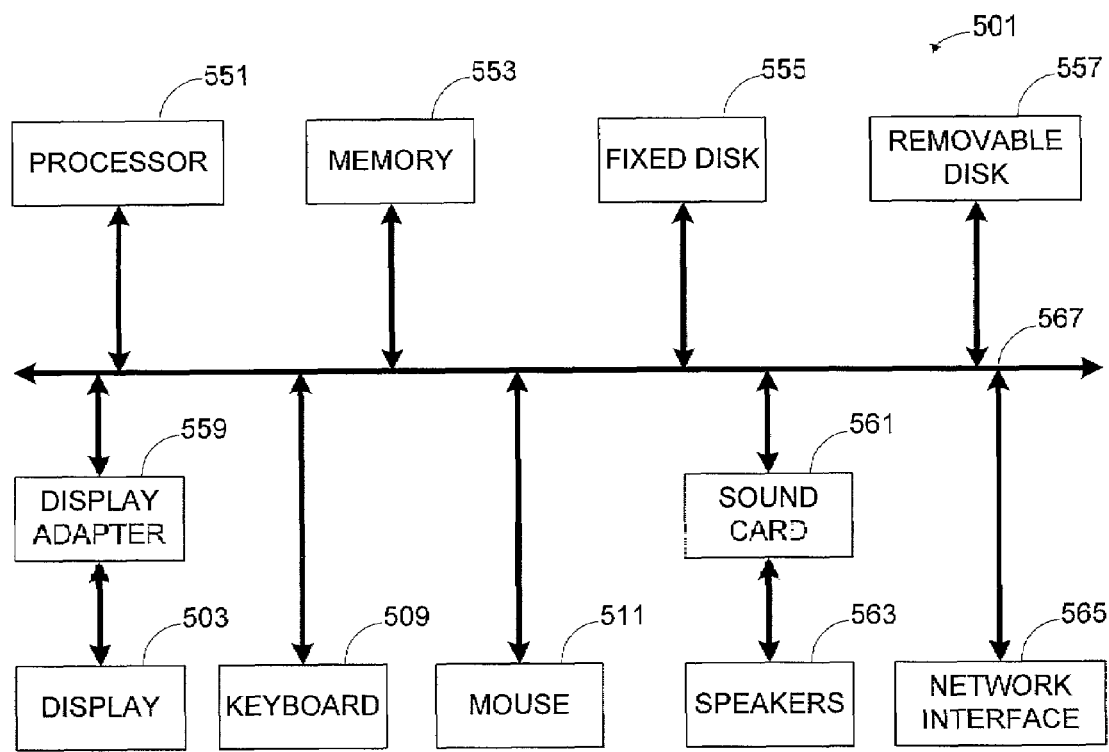

FIGS. 12A and 12B illustrate an example of a computer system suitable for use in implementing the present invention. FIG. 12A shows a computer system 501 that includes a display monitor 503 having a display 505 (or multiple displays), cabinet 507, keyboard 509, and mouse 511. Cabinet 507 houses a drive 513, such as a CD-ROM or floppy drive, system memory and a hard drive (see FIG. 12B) which may be utilized to store and retrieve software programs incorporating computer code that implements the present invention, data for use with the invention, and the like. Although CD-ROM 515 is shown as an exemplary computer readable storage medium, other computer readable storage media including floppy disk, tape, flash memory, system memory, and hard drive may be utilized. Additionally, a data signal embodied in a carrier way (e.g., in a network including the Internet) may be the computer readable storage medium. In one implementation, an operating system for the computer system 501 is provided in the system memory, the hard drive, the CD-ROM 515, or other computer readable storage medium, and serves to incorporate the computer code that implements the invention.

FIG. 12B shows a system block diagram of a computer system 501 used to execute the software of an embodiment of the invention. As in FIG. 12A, computer system 501 includes display monitor 503 and keyboard 509, and mouse 511. Computer system 501 further includes subsystems such as a central processor 551, system memory 553, fixed storage 555 (e.g., hard drive), removable storage 557 (e.g., CD-ROM drive), display adapter 559, sound card 561, speakers 563, and network interface 565. The central processor 551, may execute computer program code (e.g., an operating system) to implement the various components of the present invention as described herein, and/or may in combination with another subsystem implement the invention. The operating system is normally, but not necessarily, resident in the system memory 553 during its execution. Other computer systems suitable for use with the invention may include additional subsystems or fewer subsystems. For example, another computer system could include more than one processor 551 (i.e., a multi-processor system) or one or more levels of cache memory.

The system bus architecture of computer system 501 is represented by arrows 567. However, these arrows are illustrative of any interconnection scheme serving to link the subsystems. For example, a local bus could be utilized to connect the central processor to the system memory and display adapter. Computer system 501 shown in FIG. 12B is but an example of a computer system suitable for use with the present invention. Other computer architectures having different configurations of subsystems may also be utilized.

Thus, the present invention provides methods and apparatus for the identification and detection of scripting viruses by transforming scripting virus source code to executing threads of key actions which may compared against a known virus signature, and by converting the executing thread to a virus signature which may be stored as virus pattern file and then later extracted for matching against an executing thread. The present invention permits polymorphs of scripting virus source code to be detected where lexical and/or grammatical changes have been made to the source code, such as manipulation of white spaces, renaming of variables and/or function, and change of program layout.

Hence, although the foregoing invention has been described in some detail for purposes of clarity of understanding, it will be apparent that certain changes and modifications may be practiced within the scope of the appended claims. Therefore, the described embodiments should be taken as illustrative and not restrictive, and the invention should not be limited to the details given herein but should be defined by the following claims and their full scope of equivalents.

I claim:

1. A method for identifying a computer virus in interpreted language source code using a virus scan engine, the method comprising:
   receiving a portion of interpreted language source code;
   generating a language-independent representation of the portion of the interpreted language source code;
   comparing the language-independent representation with a virus signature in a pattern matcher; and
   determining if the language-independent representation matches the virus signature, whereby a match indicates a computer virus has been identified.

2. The method of claim 1, wherein the interpreted language source code is a scripting language sotrce code.

3. The method of claim 1, wherein the virus signature is a language-independent representation of an interpreted language source code computer virus.

4. The method of claim 1, wherein the portion of interpreted language source code and the virus signature are represented as a linearized string of key actions.

5. A method for generating a virus signature using a virus scan engine, the method comprising:
   receiving a portion of interpreted language source code containing a computer virus;
   parsing the portion of interpreted language source code into tokens using a parser;
   inputting at least a portion of the tokens into a threadizor;
   generating a language-independent representation of the computer virus from said portion of the tokens using said threadizor, wherein said language independent representation is a linearized string of key actions; and
   storing the language-independent representation of the computer virus as a virus signature.

6. The method of claim 5, wherein the interpreted language source code is a scripting language source code.

7. The method of claim 5, wherein the virus signature is compiled in binary format.

8. The method of claim 5, wherein the virus signature includes input from a virus analyst.

9. A method for identifying a virus in interpreted language source code using a virus scan engine, the method comprising:
   receiving a portion of interpreted language source code;
   parsing the portion of the interpreted language source code into tokens to generate a tokenized source code using a parser, wherein at least some of the tokens represent key actions;
   extracting selected key actions from the tokenized source code,
   linearizing the key actions to generate an executing thread;
   comparing the executing tread with a virus signature of a known virus in a pattern matcher; and
   determining whether the executing thread matches the virus signature.

10. The method of claim 9, further comprising:
    outputting the identification of the known virus.

11. The method of claim 9, wherein the portion of the interpreted language source code is lexically parsed.

12. The method of claim 9, wherein the portion of the interpreted language source code is lexically and grammatically parsed.

13. A method using a virus scan engine for generating a virus signature from a portion of interpreted language source code including a computer virus, the method comprising:
    receiving a portion of interpreted language source code containing a computer virus;
    parsing the portion of the interpreted language source code containing the computer virus into tokens to generate tokenized source code using a parser, wherein at least some of the tokens represent key actions;
    extracting key actions from the tokenized source code,
    linearizing the key actions to generate an executing thread using a threadizor;
    determining the set of minimum key actions in the executing thread required to effect the computer virus; and
    storing the set of minimum key actions as a virus signature.

14. The method of claim 13, further comprising:
compiling the virus signature in binary format.

15. The method of claim 13, comprising:
compiling the virus signature with data input by a virus analyst; and
storing the virus signature as part of a virus pattern file.

16. The method of claim 15, wherein the virus pattern file further includes a dictionary of key actions.

17. The method of claim 13, wherein the portion of the interpreted language source code is lexically parsed.

18. The method of claim 13, wherein the portion of the interpreted language source code is lexically and grammatically parsed.

19. A computer readable medium containing program code for identifying a computer virus in interpreted language source code using a virus scan engine, the computer readable medium comprising instructions for:
receiving a portion of interpreted language source code;
parsing the portion of the interpreted language source code into tokens to generate a tokenized source code using a parser, wherein at least some of the tokens represent key actions;
linearizing at least a portion of the key actions to generate an executing thread;
comparing the executing thread with a virus signature of a known computer virus in a pattern matcher; and
determining whether the executing head matches the virus signature.

20. The computer readable medium of claim 19, further comprising:
outputting the identification of the known computer virus.

21. The computer readable medium of claim 19, wherein the portion of the interpreted language source code is lexically parsed.

22. The computer readable medium of claim 19, wherein the portion of the interpreted language source code is lexically and grammatically parsed.

23. A computer readable medium containing program code using a virus scan engine for generating a virus signature from a portion of interpreted language source code including a computer virus, the computer readable medium comprising instructions for:
receiving a portion of interpreted language source code containing a computer virus;
parsing the portion of the interpreted language source code containing the computer virus into tokens to generate tokenized source code using a parser, wherein at least some of the tokens represent key actions;
linearizing at least a portion of the key actions to generate an executing thread using a threadizor;
determining the set of minimum key actions in the executing had required to effect the computer virus; and
storing the set of minimum key actions as a virus signature.

24. The computer readable medium of claim 23, further comprising:
compiling the signature in binary format.

25. The computer readable medium of claim 23, further comprising:
compiling the virus signature with data input by a virus analyst; and
storing the virus signature as part of a virus pattern file.

26. The computer readable medium of claim 25, wherein the virus pattern file further includes a dictionary of key actions.

27. The computer readable medium of claim 23, wherein the portion of the interpreted language source code is lexically parsed.

28. The computer readable medium of claim 23, wherein the portion of the interpreted language source code is lexically and grammatically parsed.

* * * * *

UNITED STATES PATENT AND TRADEMARK OFFICE
CERTIFICATE OF CORRECTION

PATENT NO. : 7,398,553 B1  Page 1 of 1
APPLICATION NO. : 10/042804
DATED : July 8, 2008
INVENTOR(S) : Jianghao Li It is certified that error appears in the above-identified patent and that said Letters Patent is hereby corrected as shown below:

In the Claims:

Col. 12, line 5, (Claim 2) change "sctrce" to --source--.

Col. 12, line 41, (Claim 9) change "tread" to --thread--.

Col. 13, line 3, (Claim 15) after "claim 13," insert --further--.

Col. 13, line 27, (Claim 19) change "head" to --thread--.

Col. 14, line 16, (Claim 23) change "had" to --thread--.

Signed and Sealed this

Twenty-eighth Day of July, 2009

JOHN DOLL
*Acting Director of the United States Patent and Trademark Office*